(12) United States Patent
Jung

(10) Patent No.: US 8,711,913 B2
(45) Date of Patent: Apr. 29, 2014

(54) DEVICE AND METHOD FOR PROCESSING INPUT DATA OF PROTECTIVE RELAY

(75) Inventor: Jong Jin Jung, Cheongju (KR)

(73) Assignee: LS Industrial Systems Co., Ltd., Anyang-Si, Gyeonggi-Do (KR)

( * ) Notice: Subject to any disclaimer, the term of this patent is extended or adjusted under 35 U.S.C. 154(b) by 583 days.

(21) Appl. No.: 13/013,724

(22) Filed: Jan. 25, 2011

(65) Prior Publication Data
US 2011/0182331 A1 Jul. 28, 2011

(30) Foreign Application Priority Data
Jan. 27, 2010 (KR) .................. 10-2010-0007466

(51) Int. Cl.
*H04B 3/46* (2006.01)
(52) U.S. Cl.
USPC ............................................ 375/224; 361/93
(58) Field of Classification Search
CPC .............. H04L 1/20; H04L 1/24; H04B 3/46;
H01H 2071/006; H01H 2071/00; H02H 3/00;
H02H 3/006; G06F 13/4059; G06F 17/142;
G01R 21/1333; G01R 22/00; G01R 31/3624
USPC ................. 375/224; 702/62; 700/94
See application file for complete search history.

(56) References Cited

U.S. PATENT DOCUMENTS

| 5,224,011 | A * | 6/1993 | Yalla et al. ................ 361/93.2 |
| 2001/0032027 | A1 * | 10/2001 | Fukami ..................... 700/94 |
| 2003/0065459 | A1 * | 4/2003 | Huber et al. .............. 702/62 |

FOREIGN PATENT DOCUMENTS

| CN | 1957513 | 5/2007 |
| JP | 2002-44854 | 2/2002 |
| JP | 2003344463 | 12/2003 |
| JP | 3805718 | 8/2006 |
| KR | 1020110014372 | 2/2011 |
| WO | 99/10959 | 3/1999 |

OTHER PUBLICATIONS

The State Intellectual Property Office of the People's Republic of China Application Serial No. 201110032561.6, Office Action dated Jan. 29, 2013, 6 pages.

* cited by examiner

*Primary Examiner* — Daniel Washburn
*Assistant Examiner* — Fitwi Hailegiorgis
(74) *Attorney, Agent, or Firm* — Lee, Hong, Degerman, Kang & Waimey

(57) ABSTRACT

A device and a method for processing an input data of an protective relay, even in case that data stored in an accumulation buffer of the protective relay is damaged due to noises, etc., that can recover it and carry out a normal measurement are provided, the invention includes a digital signal processing part comprising inputting a sampled digital data to a digital signal processing part, counting and accumulating frequency of the inputted data, comparing the accumulated value with a value of a period, inputting a value of an update accumulation buffer to a measurement accumulation buffer and initializing the update accumulation buffer if the counted accumulation frequency is equal to the value of one period; and performing an RDFT (Recursive Discrete Fourier Transform) operation on the inputted digital data to dually buffering the measurement accumulation buffer and the update accumulation buffer.

5 Claims, 4 Drawing Sheets

DEVICE AND METHOD FOR PROCESSING INPUT DATA OF PROTECTIVE RELAY

Pursuant to 35 U.S.C. §119 (a), this application claims the benefit of earlier filing date and right of priority to Korean Patent Application No. 10-2010-0007466, filed on Jan. 27, 2010, the contents of which are hereby incorporated by reference in their entirety.

BACKGROUND OF THE INVENTION

1. Field of the Invention

This invention relates to a protective relay, more specifically, to a device and a method for processing an input data of a protective relay capable of restoring damage to allow a normal measurement if data stored in an accumulation buffer of the protective relay is damaged due to noise.

2. Description of the Related Art

In an electric power system, since various electric power plants are linked complicatedly, in case that a fault occurs at a position in the linked electric power system, the faulted section should be rapidly separated from the system, and a protective relay takes charge of such role.

With the rapid operation of the protective relay, one of important elements is an accurate operation. Accordingly, in case an ineffective value is measured due to external noises inputted to a DSP (Digital Signal Processor) for obtaining a standard value for determining operations of the protective relay, a erroneous operation may be generated if the ineffective value is processed without any correction there to. Therefore, there is a need to take a complementary measure.

Namely, a recovering method is necessary if the measurement value that is a standard for determining the protective relay is not effective. FIG. 1 is a flowchart showing a conventional processing procedure for analog input signal of the protective relay. As shown in the drawing, the analog signal inputted through detecting means such as power transformer (PT) and current convertor (CT) is transformed through an analog filter and an analog-digital converting part (ADC) into a digital data (S1~S3).

Hereinafter, in the digital signal processing part (DSP), a phasor operation algorithm is prosecuted (S4). FIG. 2 is showing each of change of RMS values if analog input becomes 0. Herein, an AD_sample is a sampling data taken through the analog-digital converting part (ADC), an RMS is a value obtained by a RDFT (Recursive Discrete Fourier Transform) in the digital signal processing part (DSP).

FIG. 3 shows a case wherein ineffective signal is stored in an accumulation buffer of the RDFT due to external noise input at a point A of time.

In the case, as shown in the drawing, even though the analog input becomes 0, since the RMS value does not fall and keeps a constant value, it is not recovered before a rebooting is prosecuted.

This means that a erroneous operation may occur the moment a measurement value becomes larger than an operation preset value in relay elements controlling the operation based on size of the input signal. The erroneous operation should never occur in the protective relay.

Therefore, a complementary measure is essentially needed because the erroneous operation often occurs while displaying a constant measurement value even in a situation where there is no analog input in operation.

SUMMARY OF THE INVENTION

Accordingly, the invention has been made to solve the above-mentioned problems occurring in the prior art, and the present invention provides a device and method for processing an input data of an protective relay even in case that data stored in an accumulation buffer of the protective relay is damaged due to noises, etc., that can recover it and carry out a normal measurements.

The technical subjects to be accomplished in the invention should be not defined to the technical subjects mentioned above, and other technical subjects which is not mentioned herein can be understood by persons having ordinary knowledge in the art to which the invention does not belong, by the following detailed descriptions.

In accordance with another aspect of the present invention, there is provided a device for processing an input data of an protective relay comprising: a voltage and current detecting part for detecting a voltage and current on an electric line; an analog-digital converting part for sampling an analog signal inputted through the voltage and current detecting part by a predetermined sampling frequency and then converting the sampled analog input signal to a digital data; a memory part for dividing event data, fault data, wave data and demand data, which are inputted respectively through the voltage and current detecting part, item by item according to a predetermined control and then storing and managing them; and a digital signal processing part for controlling various operations of said parts to prosecute an RDFT (Recursive Discrete Fourier Transform) operation of a measured data inputted from the analog-digital converting part and to prosecute a buffering in a plurality of accumulation buffers and then to store item by item in the memory.

Preferably, a digital signal processing part includes a measurement accumulation buffer and an update accumulation buffer for dual RDFT operation where the digital signal processing part inputs, in every period, a value of the update accumulation buffer in the measurement accumulation buffer and then initializes the value of the update accumulation buffer to '0'.

In accordance with another aspect of the present invention, there is provided a method for processing an input data of an protective relay, comprising: inputting a sampled digital data to a digital signal processing part; counting and accumulating frequency of the inputted data, comparing a counted accumulation frequency with a value of a period; inputting a value of an update accumulation buffer to a measurement accumulation buffer and initializing the update accumulation buffer if the counted accumulation frequency is equal to the value of one period; and performing an RDFT (Recursive Discrete Fourier Transform) operation on the inputted digital data to dually buffering the measurement accumulation buffer and the update accumulation buffer.

Preferably, the method further includes initializing the update accumulation buffer and the counted accumulation frequency as well, wherein the update accumulation buffer is initialized per period where the counted accumulation frequency is equal to a value (number of samples) of one period.

Preferably, the method includes performing an RDFT operation on the inputted digital data to dually buffer the measurement accumulation buffer and the update accumulation buffer, if the counted accumulation frequency is less than the value of one period.

Effect of the Invention

The invention has an advantage in that damage to accumulation buffer value can be restored to enable a normal measurement and performance of stable measurement operation even if the accumulation buffer value is damaged by inflow of external noise when RDFT (Recursive Discrete Fourier Transform) operation is performed, which is one method of phasor operation of a digital protective relay.

DETAILED DESCRIPTION OF THE EXPLANATORY EMBODIMENT

Figure 1:
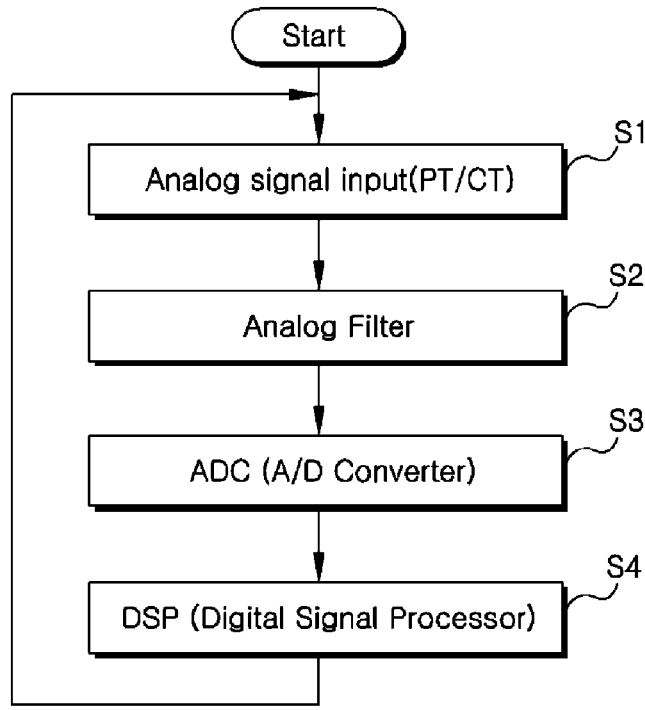
FIG. 1 is a flowchart showing a conventional processing procedure for analog input signal of the protective relay according to the prior art.
Figure 2:
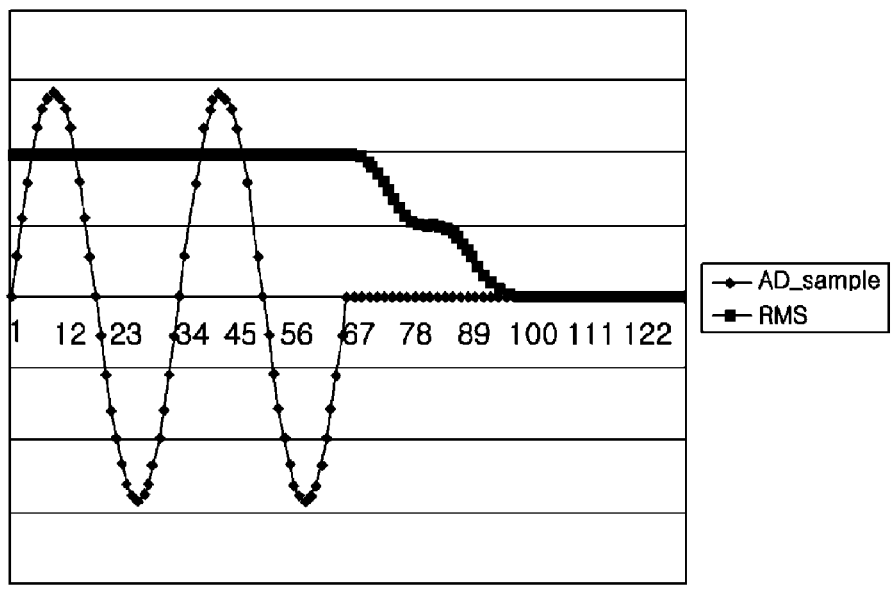
FIGS. 2 and 3 are wave shape diagrams showing each change of RMS value according to an analog input signal according to the prior art.
Figure 3:
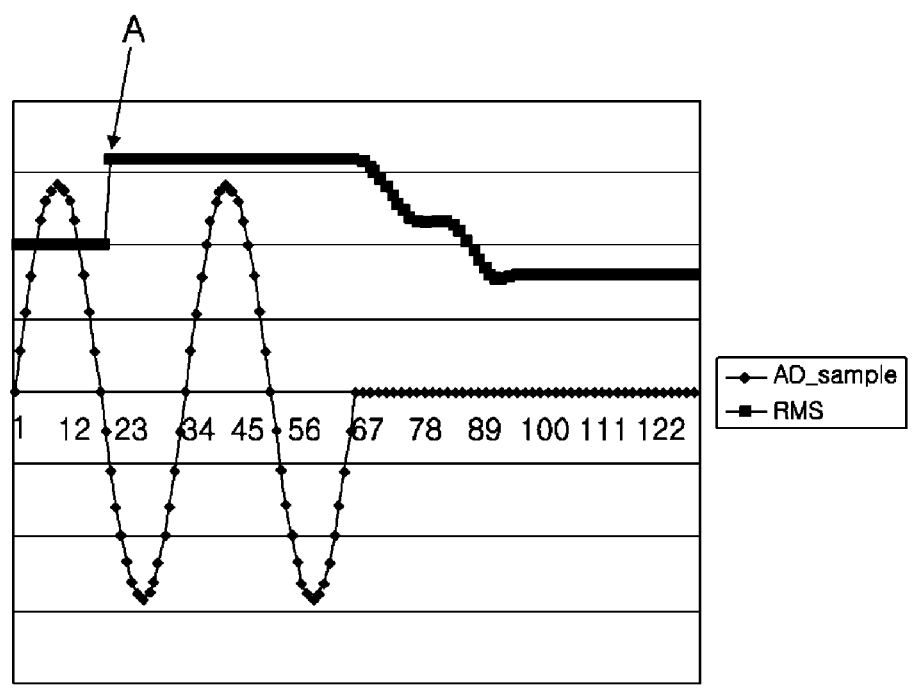

Hereinafter, a preferred embodiment of the invention will be described with reference to drawings attached thereto. Same constituent elements in drawings use same reference numerals in any places where it is possible, and explanation for well known functions and constitutions which may make indistinct a gist of the invention will be omitted.

Figure 4:
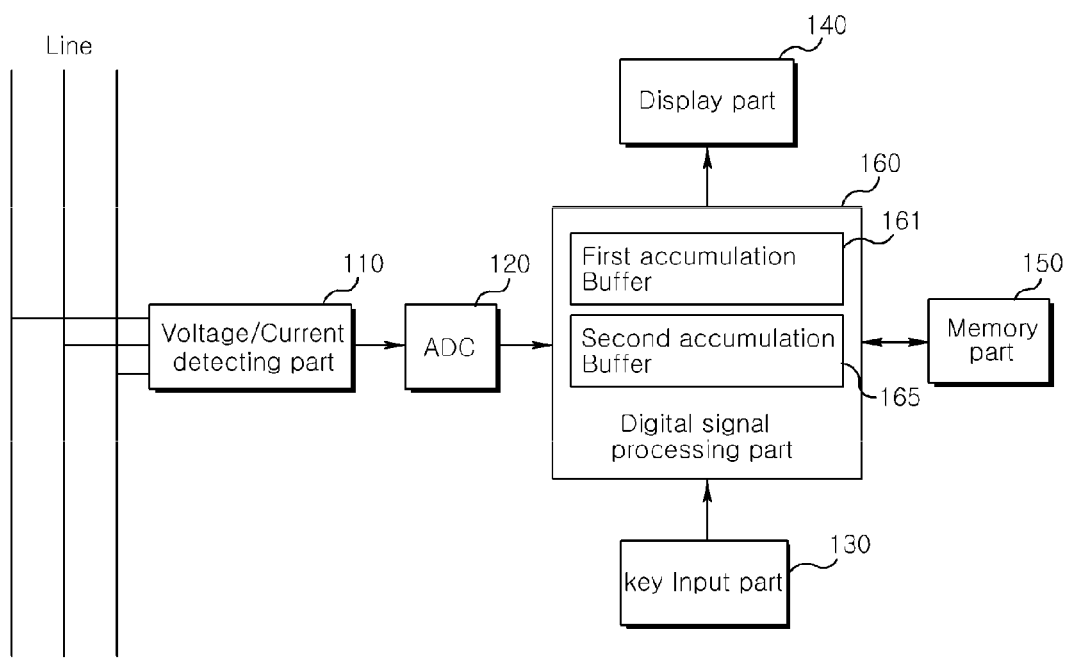
FIG. 4 is a schematic diagram showing a protective relay according to an exemplary embodiment of the present invention.

FIG. 4 is a schematic diagram showing a protective relay according to an exemplary embodiment of the present invention. Herein, the protective relay 100 includes a voltage and current detecting part 110 and an analog-digital converting part 120, a key input part 130, a display part 140, a memory part 150, and a digital signal processing part 160.

The protective relay that the present invention is applied is generally referred to an Intelligent Electronic Device (IED). the voltage and current detecting part 110 is constituted by a Potential Transformer (PT) changing a high voltage on the line to a constant ratio of low voltage and a Current Transformer (CT) changing a large current on the line to a constant ratio of low current.

The analog-digital converting part 120 (ADC) processes sampling analog input signals inputted through the voltage and current detecting part 110 with a predetermined sampling frequency and converts the sampled analog signal to digital data.

The key input part 130 is constituted to input and set user set information of various measurements and operation modes, or back-up periods or the like of the protective relay according to a predetermined operation program.

The display part 140 is constituted by LCD displaying various power source states detected through the voltage and current detecting part 110 or various set commands inputted through the key input part 130 by characters or graphics, etc.

The memory part 150 is constituted to divide and to store and manage by item by, a fault data, a wave data, a demand data and a key handling data inputted respectively through the voltage and current detecting part 110 and the key input part 130 according to a predetermined control.

The digital signal processing part 160 controls total operations of the devices as mentioned above, and prosecutes the RDFT (Recursive Discrete Fourier Transform) operation for the measuring data inputted from the analog-digital converting part 120 and then prosecutes a buffering, and thereafter, stores by item by in the memory part 140.

The digital signal processing part 160 is provided with two accumulation buffers, that is, a first accumulation buffer for measuring (a measurement accumulation buffer) 161 and a second accumulation buffer for updating (an update accumulation buffer) 165 in order to operate doubly the RDFT.

The measurement data includes event data, fault data, wave data, demand data and key handling data, etc.

In the invention, the digital signal processing part 160 operates doubly the RDFT in order to apply a manner clearing accumulation buffer of RDFT.

Figure 5:
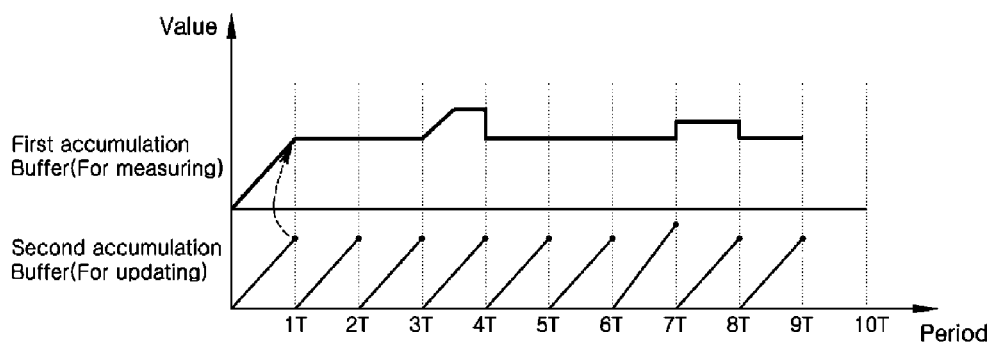
FIG. 5 is a view for explaining a data processing method using a dual structure accumulation buffer according to the present invention.

In the digital signal processing part 160, when prosecuting the RDFT (Recursive Discrete Fourier Transform) operation with the data that is converted to digital, a manner operating doubly the accumulation buffer (first accumulation buffer, second accumulation buffer) is applied as FIG. 5.

Namely, FIG. 5 represents a managing manner of the first accumulation buffer for measuring (a measurement accumulation buffer) 161 and the second accumulation buffer for updating (an update accumulation buffer) 165 which are used to RDFT, and in every period, a value of the second accumulation buffer for updating 165 is replaced for renewal in the first accumulation buffer for measuring 161 and thereafter, the second accumulation buffer for updating 165 is initialized to '0'.

In case of Full-DFT manner, since the initialization is made for the accumulation buffer every time, even though data of the accumulation buffer is damaged by external disturbances, in the next period, data of the accumulation buffer is able to be recovered automatically to an effective data, while since the RDFT manner, in case that data of the accumulation buffer is damaged, is not able to be recovered automatically, the accumulating buffers are prepared to use for measuring and update.

A formula 1 as below represents a numerical formula of Full-DFT (Discrete Fourier Transform) that is a typical manner among phaser operation algorithms for obtaining sizes and phases from instantaneous values of analog signals (voltage, current)

$$X = \frac{2}{N}\sum_{k=0}^{N-1} x_k e^{-j\frac{2\pi}{N}k}$$

$$X_{Real} = \frac{2}{N}\sum_{k=0}^{N-1} x_k \cos\frac{2\pi}{N}k$$

$$X_{Imag} = \frac{2}{N}\sum_{k=0}^{N-1} x_k \sin\frac{2\pi}{N}k$$

Formula 1 wherein, N is a size of sample window (sampling time of a period), XReal is a real component of a fundamental wave of the analog signals (voltage, current), XImag is an imaginary component of a fundamental wave of the analog signals (voltage, current).

In case of Full-DFT of Formula 1, because of taking a manner that products and accumulates Cos, Sin bases as a number of sample every time, an operation amount is much and accordingly a burden of the operation for signal processes of real time is great. According thereto, by applying the RDFT (Recursive Discrete Fourier Transform) manner which is a transformation of a Full-DFT manner, it was enabled to reduce the operation burden and at the same time, to prosecute a phaser operation.

Figure 6:
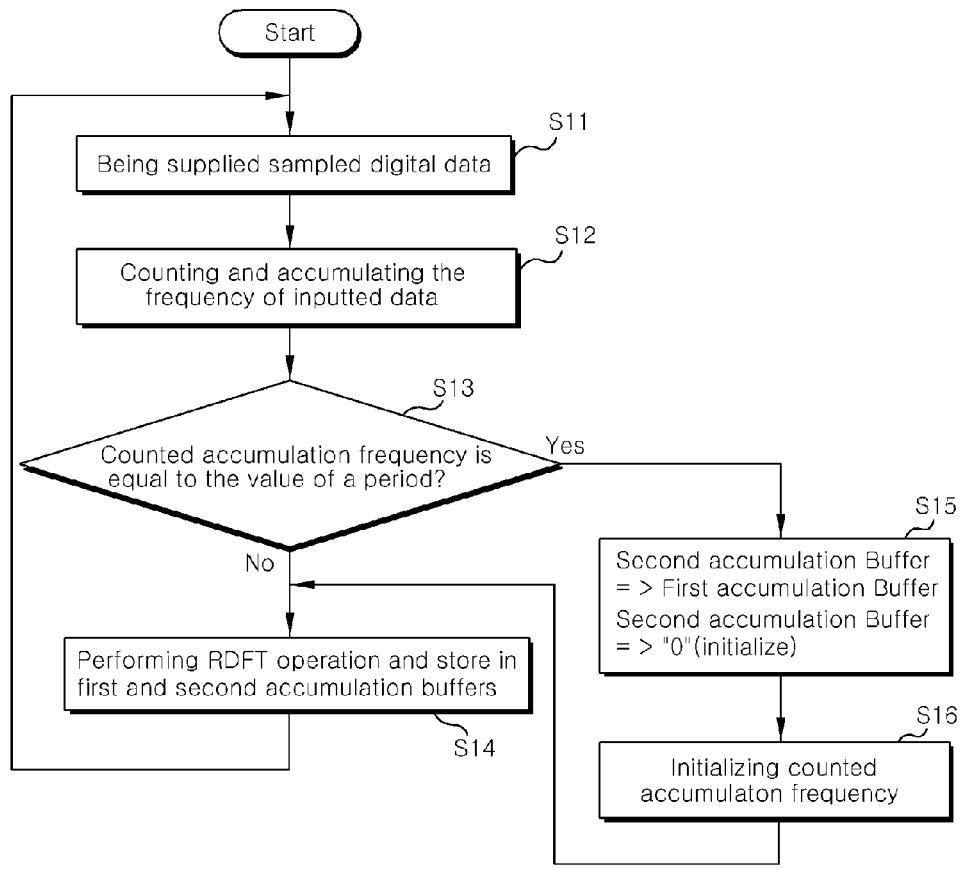
FIG. 6 is a flowchart showing processing procedures for an input data of a protective relay according to an exemplary embodiment of the present invention.

FIG. 6 is a flowchart showing operation procedures of RDFT in the digital signal processing part.

First, the digital signal processing part 160 is supplied a digital data from the analog-digital converting part 120 (S11).

Subsequently, the digital signal processing part 160 counts and accumulates the frequency of data inputted from the analog-digital converting part 120 and thereafter, compares the counted accumulation frequency with the value of a period to determine whether it is same (S12, S13).

In the above, if the counted accumulation frequency is less than the value of a period, the digital signal processing part 160 performs the RDFT operation for digital data inputted from the analog-digital converting part 120 and stores temporarily and doubly in the first accumulation buffer for measuring 161 and the second accumulation buffer for updating 165 (S14).

If in the step S13, the counted accumulation frequency and the value of a period are same, the digital signal processing part 160 replaces the value of the second accumulation buffer for updating 165 to the first accumulation buffer for measuring 161 and then initializes the second accumulation buffer for updating 165 (S15). Namely, in the invention, when the counted accumulation frequency gets to be equal to the sample number of a period, a manner which replaces the value of the second accumulation buffer for updating 165 into the first accumulation buffer for measuring 161 and then, inputs the second accumulation buffer for updating 165 is used.

Subsequently, the digital signal processing part 160 gets also to input the counted accumulation frequency to '0' (S16).

After inputting each of the second accumulation buffer for updating 165 and the counted accumulation frequency to '0', the digital signal processing part 160 prosecutes the RDFT operation for the inputted digital data and then stores temporarily and doubly in the first accumulation buffer for measuring 161 and the second accumulation buffer for updating 165 (S14).

Since the digital signal processing part 160 prosecutes the RDFT operation using the first accumulation buffer for measuring 161 and second accumulation buffer for updating 165, even though, in an intermediate, a value that is not effective is inputted in the accumulation buffer, in the next period, it is possible to measure using the effective data. Namely, the digital signal processing part 160 prosecutes doubly the RDFT operation in order to apply a manner clearing the accumulation buffer of the RDFT.

A formula 2 as below represents the RDFT (Recursive Discrete Fourier Transform) to which the invention is applied.

$$X = X_{pre} + \frac{2}{N}(x_k - x_{k\_pre})e^{-j\frac{2\pi}{N}k}$$

$$X_{Real} = X_{Real\_pre} - \frac{2}{N}(x_k - x_{k\_pre})\cos\frac{2\pi}{N}k$$

$$X_{Imag} = X_{Imag\_pre} + \frac{2}{N}(x_k - x_{k\_pre})\sin\frac{2\pi}{N}k$$

Formula 2 wherein, N is a size of sample window (sampling time of a period), $X_{Real}$ is a real component of a fundamental wave of the analog signals (voltage, current), $X_{Imag}$ is an imaginary component of a fundamental wave of the analog signals (voltage, current), Xpre is a previous value of the accumulation buffer, $x_k$ is a sample data of $k^{th}$ period, and $x_{k\_pre}$ is a sample data prior to a period of the $k^{th}$ period.

Accordingly, in the invention, even in case that though a phaser operation algorithm of a manner that does not initialize the RDFT (Recursive Discrete Fourier Transform) is applied and a value of the accumulation buffer is damaged due to intervening of noises, etc., it is possible that this is automatically recovered. This means that a system protection function can be secured more surely by enhancing a reliability of operation that is one factor of important requirements of the protective relay.

While the invention has been shown and described with reference to exemplary embodiments thereof, it will be understood by those skilled in the art that various changes in form and details may be made therein without departing from the spirit and scope of the invention as defined by the appended claims.

What is claimed is:

1. A device for processing input data of a protective relay, the device comprising:
   a detecting unit configured to detect a voltage and current;
   an analog-digital converting unit configured to convert an analog signal input via the detecting unit into digital data, the digital data comprising event data, fault data, wave data, and demand data;
   a memory configured to store data; and
   a digital signal processing unit comprising a measurement accumulation buffer and an update accumulation buffer, the digital signal processing unit configured to:
   perform an RDFT (Recursive Discrete Fourier Transform) operation on the digital data input via the analog-digital converting unit;
   buffer the RDFT-operated data in the measurement accumulation buffer and the update accumulation buffer;
   control the memory to store the buffered data item-by-item; and
   in every period, input a value of the update accumulation buffer to the measurement accumulation buffer and initialize the value of the update accumulation buffer to '0'.

2. A method for processing input data of a protective relay, the method comprising:
   receiving digital data via a digital signal processing unit;
   counting and accumulating a number of the received data;
   comparing the accumulated number to a value of a period;
   inputting a value of an update accumulation buffer to a measurement accumulation buffer;
   initializing the update accumulation buffer if the accumulated number is equal to the value of the period;
   performing an RDFT (Recursive Discrete Fourier Transform) operation on the received digital data; and
   buffering the RDFT-operated data in the measurement accumulation buffer and the update accumulation buffer.

3. The method of claim 2, further comprising initializing the accumulated number of the update accumulation buffer.

4. The method of claim 2, wherein the update accumulation buffer is initialized per period and the accumulated number is equal to a number of samples of the period.

5. The method of claim 2, further comprising performing an RDFT operation on the received digital data and buffering the measurement accumulation buffer and the update accumulation buffer if the accumulated number is less than the value of the period.

* * * * *